United States Patent
Fujimoto et al.

(10) Patent No.: US 8,475,270 B2
(45) Date of Patent: Jul. 2, 2013

(54) GAME SYSTEM AND GAME TERMINAL

(75) Inventors: Eisaku Fujimoto, Tokyo (JP);
Tomotake Haruta, Tokyo (JP); Yuichi Hasegawa, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 219 days.

(21) Appl. No.: 12/746,981

(22) PCT Filed: Dec. 16, 2008

(86) PCT No.: PCT/JP2008/072873
§ 371 (c)(1),
(2), (4) Date: Nov. 29, 2010

(87) PCT Pub. No.: WO2009/101748
PCT Pub. Date: Aug. 20, 2009

(65) Prior Publication Data
US 2011/0070947 A1    Mar. 24, 2011

(30) Foreign Application Priority Data
Feb. 13, 2008  (JP) .................................. 2008-031988

(51) Int. Cl.
*A63F 13/00*   (2006.01)
*A63F 9/24*    (2006.01)

(52) U.S. Cl.
USPC ................................ 463/30; 463/42; 463/43

(58) Field of Classification Search
None
See application file for complete search history.

(56) References Cited

U.S. PATENT DOCUMENTS 6,095,620 A * 8/2000 Dillard et al. .................... 303/11
6,095,920 A * 8/2000 Sadahiro ............................ 463/2

(Continued)

FOREIGN PATENT DOCUMENTS

JP      09-234285 A    9/1997
JP    2004-223084 A    8/2004

(Continued)

OTHER PUBLICATIONS

International Search Report for International Application PCT/JP2008/072873 (Dec. 16, 2008.).

*Primary Examiner* — David L Lewis
*Assistant Examiner* — Shauna-Kay Hall
(74) *Attorney, Agent, or Firm* — Edwards Wildman Palmer LLP; Brian R. Landry

(57) ABSTRACT

There is provided a game system where only states effective as a play state of a quasi-player are reproduced in a game. The game terminal 1 has a history information accumulating portion 14b for generating play history information PHI where, with respect to each of positions M obtained by player P, each of operations performed until the position M was obtained and a timing when the operation was performed are associated with each other, a excerpt information generating portion 14c for obtaining the play history information PHI from the server 2 to excerpt only pieces of play information PI which affects the game, and an other-player display controlling portion 14c for, by using the excerpted pieces of information as the play history information of the other player P', displaying a predetermined indicator in sequence at the position M obtained by the other player P' at the timing when the position M was obtained last.

16 Claims, 12 Drawing Sheets

U.S. PATENT DOCUMENTS

| | | | |
|---|---|---|---|
| 6,213,873 B1* | 4/2001 | Gasper et al. | 463/14 |
| 6,755,654 B2* | 6/2004 | Hightower | 434/69 |
| 7,214,133 B2* | 5/2007 | Jen et al. | 463/42 |
| 8,100,771 B2* | 1/2012 | Maeda et al. | 463/42 |
| 8,133,115 B2* | 3/2012 | Campbell | 463/31 |
| 2003/0054869 A1* | 3/2003 | Hightower | 463/6 |
| 2006/0003825 A1* | 1/2006 | Iwasaki et al. | 463/2 |
| 2007/0060359 A1* | 3/2007 | Smith | 463/42 |

FOREIGN PATENT DOCUMENTS

| | | |
|---|---|---|
| JP | 2005-160579 A | 6/2005 |
| JP | 2005-199016 A | 7/2005 |
| JP | 2005-211586 A | 8/2005 |
| JP | 3824617 A | 7/2006 |
| JP | 4019101 A | 9/2007 |
| JP | 2007-267860 A | 10/2007 |
| TW | 200420330 | 10/2004 |

* cited by examiner

FIG. 4

PHI

| PI | Operation Timing | Operation Cell | Operation Data | Operation Info. | True-false Info. |
|---|---|---|---|---|---|
| PI | Operation Timing | Operation Cell | Operation Data | Operation Info. | True-false Info. |
| PI | Operation Timing | Operation Cell | Operation Data | Operation Info. | True-false Info. |
| PI | Operation Timing | Operation Cell | Operation Data | Operation Info. | True-false Info. |
| PI | Operation Timing | Operation Cell | Operation Data | Operation Info. | True-false Info. |

●
●
●

| PI | Operation Timing | Operation Cell | Operation Data | Operation Info. | True-false Info. |
|---|---|---|---|---|---|

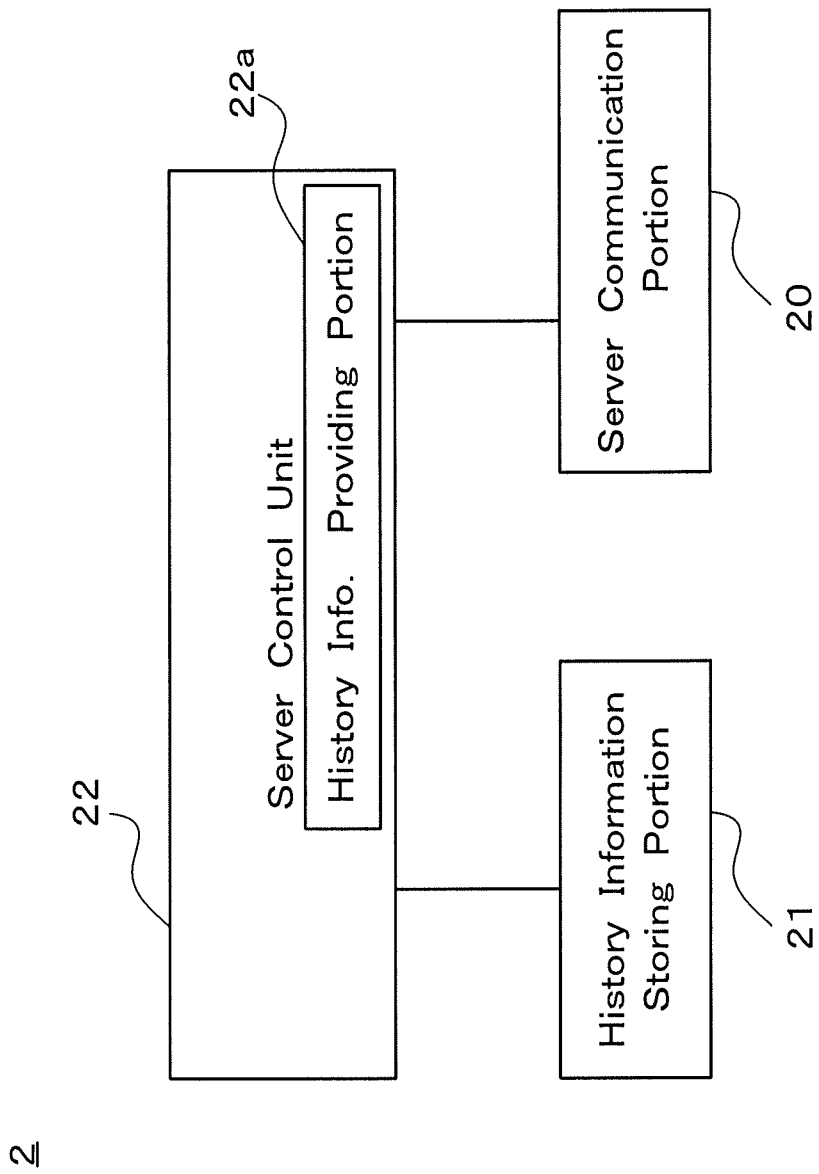

| Player ID | Profile | Verification Information | Rank | Level | Clear Time | Play History Information |

GAME SYSTEM AND GAME TERMINAL

CROSS-REFERENCE TO RELATED APPLICATIONS

This application is the national phase application pursuant to 35 U.S.C. §371 of International Application No. PCT/JP2008/072873, filed Dec. 16, 2008, which claims the benefit of priority of Japanese Patent Application No. 2008-0031988, filed Feb. 13, 2008. These applications are hereby incorporated herein by reference in their entireties.

TECHNICAL FIELD

The present invention relates to a game system including a game terminal where a predetermined game is executed and a server, and the game terminal.

BACKGROUND ART

There is an already known game system where a game is executed with a virtual player of CPU as a game system where, even if a real opponent player does not exist, a quasi game can be executed with a virtual player (refer to e.g. a patent document 1). There is also an already known game system where a virtual player attends based on play history information of other players obtained from other game terminals or a server (refer to e.g. a patent document 2).
Patent Document 1: Patent Publication No. 4019101
Patent Document 2: Patent Publication No. 3824617

DISCLOSURE OF THE INVENTION

Problem to be Solved by the Invention

However, for example, in a case a game progresses with a CPU of a server as a virtual player, data communication between the server and the game terminal is required frequently. Especially, in a case the game terminal is a movable terminal, communication troubles happen easily that makes it hard to always provide comfortable game circumstances to a player. Moreover, in a case where the CPU of the server is set to the virtual player, game progress is likely to be monotonous. As mentioned above, though a case is also provided that the virtual player attend the game based on the play history information of the other player, play contents in the game are only reproduced as they are according to the play history. However, in a case where only a predetermined state in a game affects a game result and it does not matter how to reach the predetermined state, it is not necessary to reproduce all states. Especially, a play state of the other player is displayed in the same game screen as a play state of the player is displayed, the display of the game screen looks cumbersome, which generates a problem that it is harder to play the game.

Then, the present invention aims to provide a game system and a game terminal which are configured such that only states effective as a play state of the virtual player are reproduced in a game.

Means for Solving Problem

The present invention solves the above mentioned problem by the following means.

The game system of the present invention solves the above problem by being configured such that: a A game system including a game terminal where operations by a player are accepted and a predetermined game is executed and a server capable of communicating data with the game terminal, wherein the game terminal comprises: a display portion for displaying game image of the predetermined game; a game executing portion for executing a game where a position is obtained by operations performed by a player as the predetermined game, each of the operations for obtaining any one of positions in the game image, and a plurality of positions obtained affect a game result; and a history information accumulating portion for generating play history information with respect to each of positions obtained by the player during the game, accumulating pieces of play information, each piece of play information including an operation performed up to obtaining one of the positions and a timing when the operation is performed which are associated with each other, and the server comprises: a history information storing portion for storing history information based on the play history information for each player; a history information providing portion for referring the history information storing portion to select one piece of the history information, and providing information based on the selected piece of history information, the game terminal or the server has an excerpt information generating portion for generating excerpt information, excerpting from the player history information or the selected history information, the pieces of play information relating to an operation performed last for each of obtained positions, the game executing portion of the game terminal has: an excerpt information obtaining portion for obtaining the excerpt play history information by requiring to the server, the information relating to the other player; and an other player display controlling portion for controlling a display of the game image so as to display in sequence by following the timing indicated by each piece of play information included in the obtained excerpt play history information, an indicator at the position indicated by the piece of play information, the indicator indicating that the corresponding position was obtained by the other player.

According to the game system of the present invention, all of the play history information is not used. By the excerpt information generating portion, a piece of play information with respect to the last operation for each of the obtained positions is excerpted from the play history information, and based on the generated play history information, a play state of the other player is displayed. In the present invention, the excerpt play history information is generated, so that the timing when the last operation was performed for each of the obtained positions is set as the timing when each of the positions was obtained. In the excerpt play history information, operations up to obtainment of each position are eliminated, whereby a state such that the other player sequentially obtains only positions to affect the game result. Like the game of the present invention, in a case of a game where only the case that the game becomes a predetermined state affects the game result, and the operations performed until the predetermined state are not important, all you have to do is present only the states to affect the game result to the player, it is possible to provide enough the player with a tense feeling of competing with another player in the game. Moreover, the preset invention is configured so that, by the other player display controlling portion, a play state of a player and a play state of the other player are displayed on a same game image in order to prevent a plurality of game images from being displayed at once which makes a size of game image smaller. As mentioned above, as it is possible to display the play state of the player and the play state of the other player are displayed on the same game image and all of the play states of the other player are not displayed, it is possible to sufficiently provide a tense feeling of competing a game without making the game image messy. Additionally, when a position to be obtained or/and an order of obtaining a position for clearing the game is/are uniquely determined, the display with respect to the other player can giver a hint to the player.

"History information based on the play history information" includes a case of the play history information itself and a case of information obtained by processing the play history information. "Information based on the history information" includes a case of the history information itself and a case of information obtained by processing the history information. Accordingly, when the excerpt information generating portion is provided in the server, the present invention includes two cases, that is, one case where the server obtains the play history information from the game terminal, stores the play history information in the history information storing portion, generates the excerpt play history information from the play history information selected in response to a request from a game terminal, and provides the excerpt play history information to the game terminal, and another case where the server generates the excerpt play history information from the obtained play history information, stores the excerpt play history information in the history information storing portion to provide it to the game terminal. When the excerpt information generating portion is provided in a game terminal, the present invention includes two cases, that is, one case where a game terminal generates the excerpt play history information from the play history information and transmits the excerpt play history information to the server, and another case where the play history information is transmitted from a game terminal to the server and stored in the history information storing portion, the play history information is provided to a game terminal in a response to a request, and the excerpt play history information is generated in the game terminal.

The game of the present invention includes, for example, a game where a plurality of positions are prepared in a game image in advance, a player competes for obtaining each position in accordance with a predetermined conditions or a game where areas each of which has a various shape like a piece for a puzzle are prepared, and a player combines them to make a predetermined shape. When the predetermined shape is made by the combined areas, the player obtain at least one part of the combined areas. "The indicator indicating that the corresponding position was obtained by the other player" includes, for example, a case of displaying an indicator having a predetermined shape or color at the position when the position is a point, a case where, when the position has a predetermined shape, a color or a pattern corresponding to the other player is applied to the shape and the like.

The excerpt information generating portion may be provided in the game terminal to generate the excerpt play history information from the play history information generated by the history information accumulating portion of the game terminal, the game terminal may comprise a history information transmitting portion for transmitting to the server, the excerpt play history information generated by the excerpt information generating portion, the history information storing portion of the server may store for each player, the excerpt play history information transmitted from the game terminal, and the history information providing portion of the server may provide the excerpt play history information selected to the game terminal. Thereby, the excerpt play history information is generated at the game terminal where the play history information has been accumulated, and the excerpt play history information is held and provided by the server. Accordingly, it is possible to reduce the load of the server and the amount of data communication.

The excerpt information generating portion mat be provided in the game terminal, the game terminal may have a history information transmitting portion for transmitting to the server, the play history information generated by the history information accumulating portion, the history information storing portion of the server may store for each player, the play history information transmitted from the game terminal, the history information providing of the server may provide the game terminal with the play history information selected, and the excerpt information generating portion of the game terminal may generate the excerpt play history information from the play history information provided.

Thereby, the play history information itself is transmitted to the server, stored in the history information storing portion, and provided to the game terminal. At the game terminal to which the play history information has been provided, the excerpt play history information is generated. The play history information including a history of all operations is transmitted to the server, whereby, it is possible to use the play history information not only for displaying the play state of the other player, for example, it is possible to determine at the server, a skill level of the player based on the play history information.

A game terminal of the present invention solves the above mentioned problem by being configured such that: a game terminal comprising a display portion for displaying game image of a predetermined game, capable communicating data with a server or the other game terminal, further comprising: a game executing portion for executing a game where a position is obtained by operations performed by a player as the predetermined game, each of the operations for obtaining any one of positions in the game image, and a plurality of positions obtained affect a game result; a history information accumulating portion for generating play history information with respect to each of positions obtained by the player during the game, accumulating pieces of play information, each piece of play information including an operation performed up to obtaining one of the positions and a timing when each operation is performed are associated with each other, a history information transmitting portion for transmitting to the server or the other game terminal, history information based on the play history information accumulated by the history information accumulating portion, an excerpt information generating portion for generating excerpt information, excerpting from the player history information, the pieces of play information relating to an operation performed last for each of obtained positions, an excerpt information obtaining portion for obtaining the exception play history information by requesting the history information based on the play history information of the other player to the server or the other game terminal, and an other player display controlling portion for controlling a display of the game image so as to display in sequence by following the timing indicated by each piece of play information included in the excerpt play history information of the other player, an indicator at the position indicated by the piece of play information, the indicator indicating that the corresponding position was obtained by the other player.

According to the game terminal of the present invention, the history information based on the play history information of the other player is required from the server or the game terminal, whereby, the excerpt play history information can be obtained. The excerpt play history information is obtained by excerpting information to affect a game result from the play history information. The significance of the excerpt play history information and the significance of displaying the play state of the other player in the game image based on the excerpt play history information are as mentioned above. "History information based on the play history information" includes a case of the play history information itself and a case of information obtained by processing the play history information, that is, the excerpt play history information.

Accordingly, the present invention includes two cases, that is, one case where the history information transmitting portion transmits the play history information to the server or the other game terminal, and the excerpt information obtaining portion requests the play history information to the server or the other game terminal and makes the excerpt information generating portion generate the excerpt play history information from the obtained play history information, and another case where the excerpt information generating portion generates the excerpt play history information from the play history information of the player of its own, the history information transmitting portion transmits the excerpt play history information as the information based on the play history information to the server or the other game terminal, and the excerpt information obtaining portion obtains the excerpt play history information transmitted from the server or the game terminal. Additionally, the meaning of the game of the present invention and the meaning of "the indicator indicating that the corresponding position was obtained by the other player" are as mentioned above.

The excerpt information generating portion may generate the excerpt play history information from the play history information accumulated by the history information accumulating portion of the game machine, the history information transmitting portion may transmit the excerpt play history information generated by the excerpt information generating portion, and the excerpt information obtaining portion may obtain the excerpt play history information by requesting to the server, the excerpt play history information of the other player. Thereby, information communicated between the server and the game terminal is the excerpt play history information. Accordingly, it is possible to reduce the amount of data communication.

The history information transmitting portion may transmit the play history information to the server, the excerpt information generating portion may generate the excerpt play history information from the play history information obtained from the server, and the excerpt information obtaining portion may obtain the excerpt play history information by requesting the play history information of the other player to the server to make the excerpt information generating portion generate the excerpt play history information. Thereby, as the play history information is transmitted to the server, it is possible to use the received play history information at the server for processes such as a determination of play skill besides a display of the play state of the other player.

The history information accumulating portion may generate the play history information, accumulating the pieces of play information from the moment of starting the game until the moment of ending the game, the history information transmitting portion may transmit the play history information after the moment of ending the game, and the excerpt information obtaining portion may obtain the excerpt play history information before the moment of starting the game. Thereby, it is possible to generate the excerpt play history information based on the play history information including all pieces of play information from the start to the end of the game.

Each of the plurality of positions may be a region having a predetermined shape in the game image, and the other player display controlling portion may color in sequence by following the timing, the region corresponding to the position where the indicator should be indicated with a color corresponding to the other player. Thereby, in the game image, it is possible to represent a state of increasing gradually in the game image, areas having a color corresponding to the other player.

The game executing portion may allow the player to input information to be associated with each of the regions, and, when there is a predetermined relation between the information associated with one of the regions and the other region associated with at least one cell, determine the region having the predetermined relation has been obtained. Ina case of this type of game, it is required that information input in the cells meets a predetermined conditions in order to obtain the corresponding areas. According to the present invention, the information is not shown, but only the positions obtained are shown. As the information input by the other player is not shown, even in a case where, for example, information to be a correct answer is uniquely determined, the correct answer will not be taught to the player, whereby, enjoymentability as a puzzle game is not lessened.

The game terminal may be a portable terminal which is carriageable. According to the game system of the present invention, the play state of the other player is shown quasily by using the play history information, and communication is not used frequently in the game, whereby, a communication state does not give affection during the game.

Effect of the Invention

As mentioned above, according to the present invention, with respect to the obtained position in the game image, only pieces of play information to affect the game are excerpted from the play history information where the operations performed until each position was obtained and the timing when each of the operations was preformed are associated with each other. By using the excerpted information as the play history information of the other player, a predetermined indicator is shown in the same game image as the player's indicator at the position obtained by the other player at the timing when the other player obtained the position. Thereby, it is possible to provide a game system and the like configured so that only a state which is effective as a play state of a quasi-player is reproduced in the game.

BRIEF DESCRIPTION OF DRAWINGS

FIG. 4 is a diagram showing data structure of play information and play history information;

FIG. 5 is a diagram showing a schematic configuration of hardware of the server shown in FIG. 1;

FIG. 6 is a diagram showing player data;

BEST MODE FOR CARRYING OUT THE INVENTION

Figure 1:
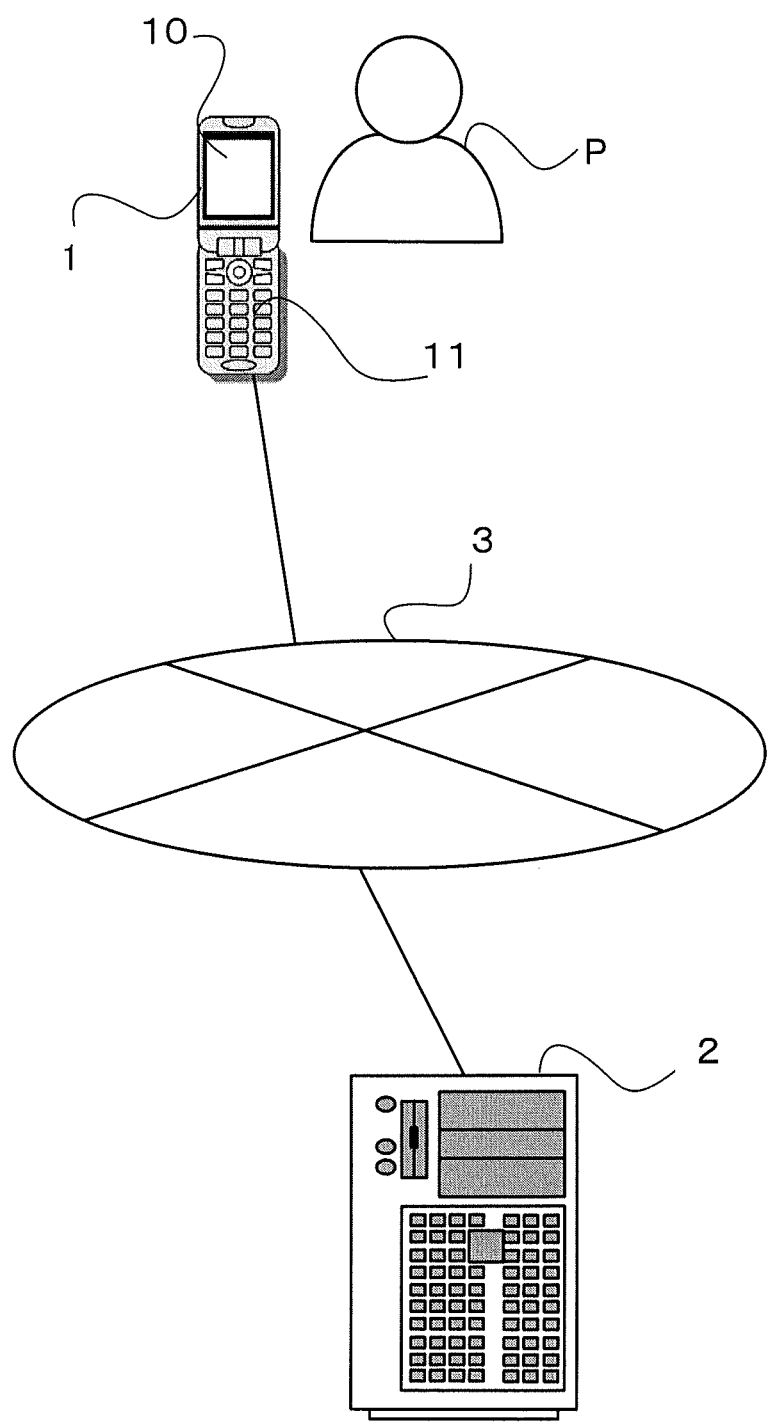
FIG. 1 is a diagram showing an example game system of the present invention.

FIG. 1 shows an example of a game system GS of the present invention. The game system GS is configured by a game terminal 1 accepting operations by a player to execute a predetermined game and a server 2 capable of transmitting and receiving data via a network 3. The game terminal 1 is a well-known portable telephone having a display portion 10 and an input portion 11. Accordingly, the game terminal 1 and the network 3 are connected with each other without wires partially. The game executed in the game terminal 1 is a so-called puzzle game where a player P answers to a taken question. The game system GS realizes a puzzle game where a play state of an other player can be also displayed by using play history of the other player.

Figure 2:
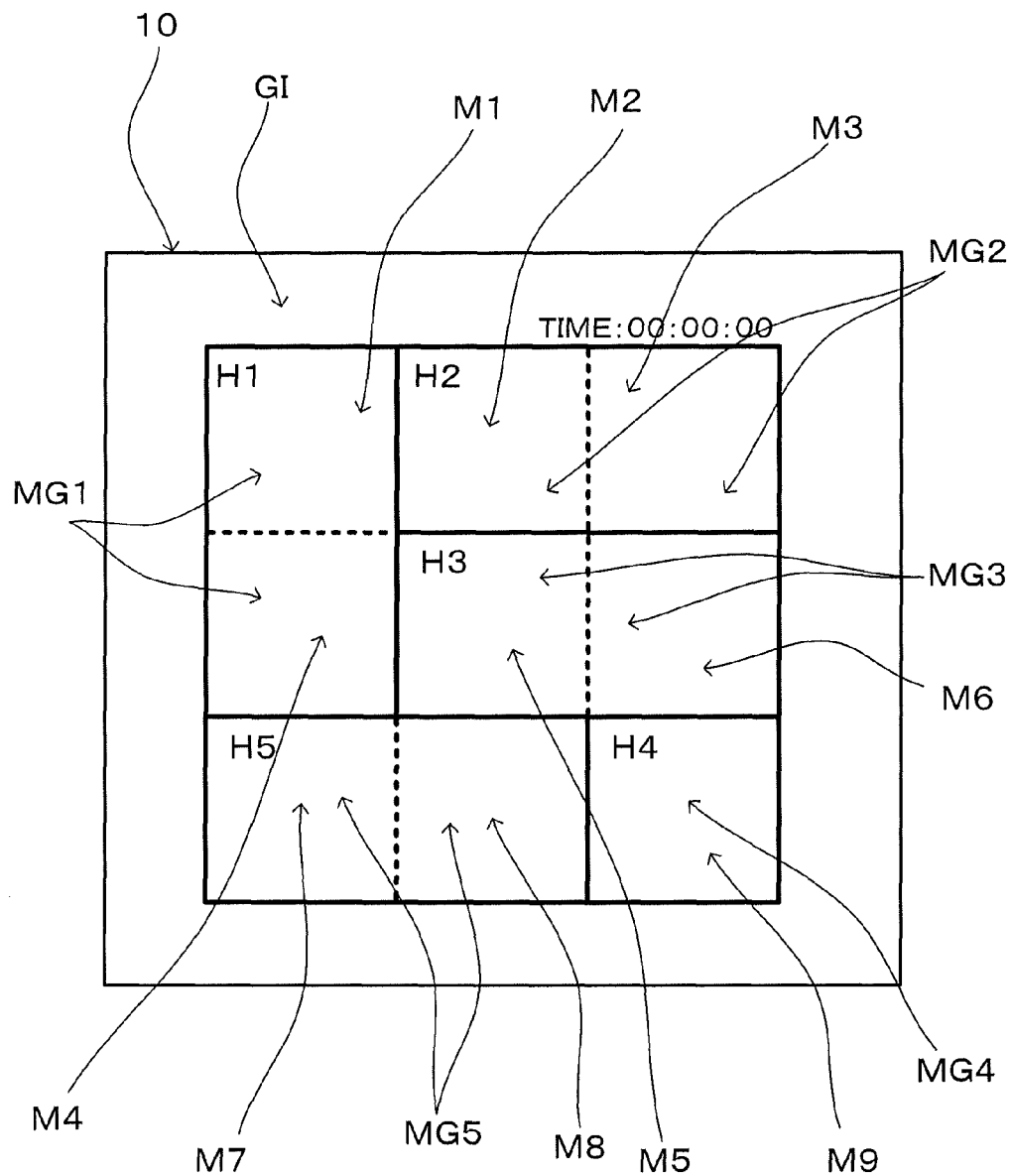
FIG. 2 is a diagram showing a game image of the game executed at the game terminal shown in FIG. 1.

The game of the present embodiment will be described. First, the game image GI as shown in FIG. 2 is displayed on the display portion 10, and the game progresses with respect to the game image GI. The game image GI is structured by nine pieces of cells M1 to M9 forming a grid. Hereinafter, when it is not necessary to distinguish between the cells M1 to M9, each of the cells is referred to as the "cell M". In the game image GI, further, the cell(s) more than one is (are) surrounded by a bold line to make a group. In this embodiment, five cell groups MG1 to MG5 are formed.

Each of the cell groups MG1 to MG5 is associated with each hint letter H1 to H5. Although the hint letter H1 to H5 is represented as a letter in FIG. 2, actually is a numeral such as 1, 2, . . . . Hereinafter when it is not necessary to distinguish between the cell groups MG1 to MG5, each of the cell groups MG1 to MG5 is referred to as "the cell group MG". When it is not necessary to distinguish between the hint letters H1 to H5, each of the letters H1 to H5 is referred to as "the hint letter H". Note that as long as plural cells M included in the cell group MG neighbor each other, the number of cell groups MG and the number of cells included in each cell group MG are not limited to the embodiment shown in FIG. 2.

The numeral 1 to 3 is input in each of the cells by a player. At the moment, the numerals have to be input so as not overlap in each column and each row, and so as to coincident a total in the cell group with the hint letter H corresponding to the cell group. The player moves an operation cursor to the cell which is an operation object to input or eliminate a numeral with respect to the cell which the cursor is pointing at, whereby inputs a numeral in all cells so as to meet the above mentioned conditions. The numeral of each hint letter H is set in such a manner that the numeral input in each cell is uniquely determined. Accordingly, a correct answer is one to each game image GI. When a determination request operation is performed by a player, it is determined whether or not the numeral input in each of the cells is correct. When all of the cells are correct, it means that the player has cleared the game.

An elapse time after starting the game is displayed at the upper right in the game image GI, and time until the game is cleared (hereinafter referred to as "the clear time") is counted. AS the time until the game is cleared is faster, a better score is given. During the game, in the game image GI, a quasi play state of the other player is also displayed together with a play state of a player P. The game image GI during the game will be described later.

Figure 3:
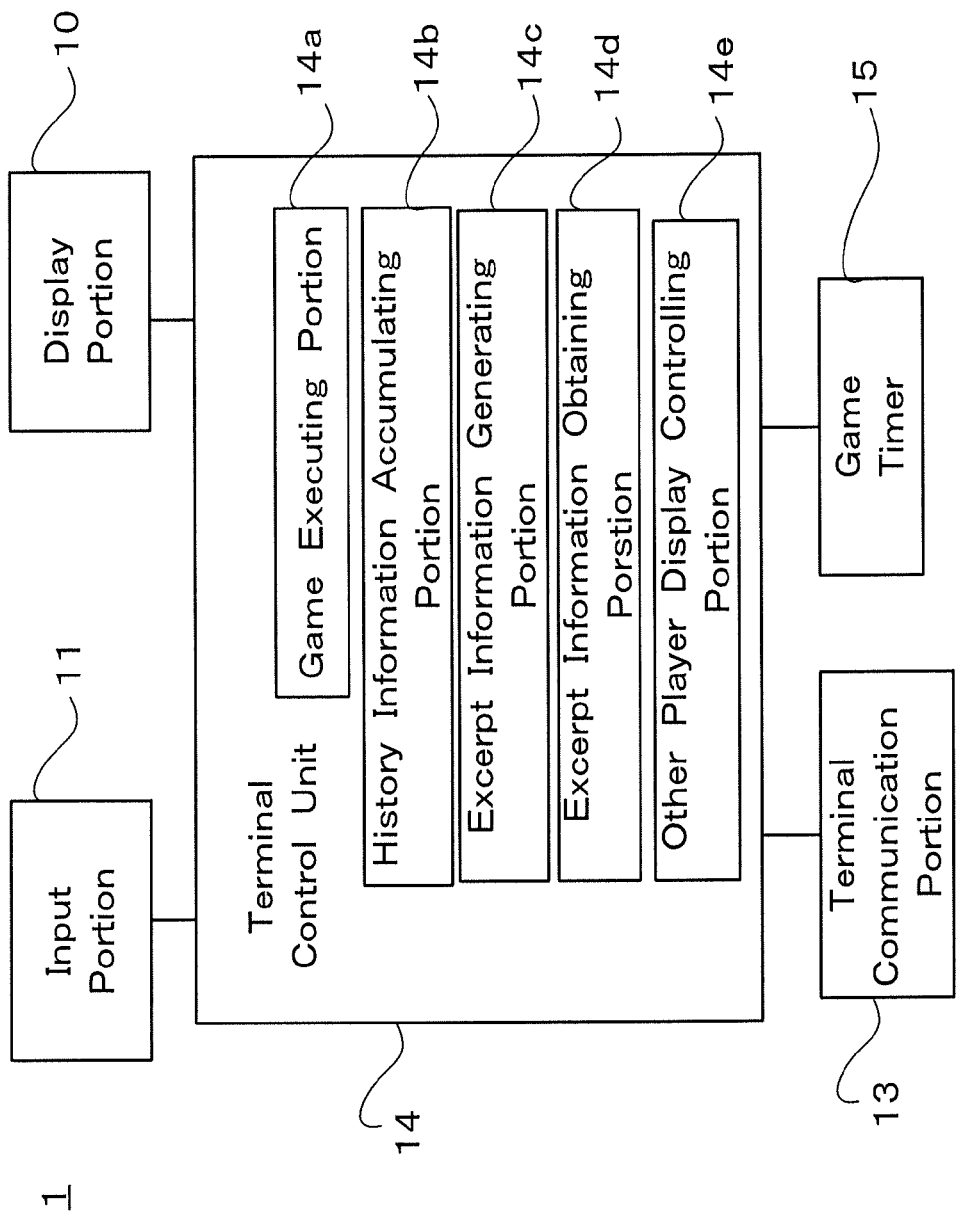
FIG. 3 is a diagram showing a schematic configuration of hardware of the game terminal shown in FIG. 1.

An outline of hardware configuration of the game terminal will be described by using FIG. 3. The game terminal 1, besides the above mentioned display portion 10 and the input portion 10, comprises a terminal communication portion 13 which is an interface for communicating data with the server 2, a game timer 15 which counts an elapse time in the game, and a terminal control unit 14 which controls operations in the game terminal 1. The terminal control unit 14 is configured mainly by a CPU and a memory area such as a RAM and a ROM necessary for operations of the CPU. In the memory area, a program for realizing the present invention is stored. By executing the program, the terminal control unit 14 functions as a game executing portion 14a, a history information accumulating portion 14b, an excerpt information generating portion 14c, an excerpt information obtaining portion 14d and an other player display controlling portion 14e. Additionally, in the memory area of the terminal control unit 14, the questions and the correct answers of the game are stored.

The game executing portion 14a progresses the above mentioned game. The history information accumulating portion 14b generates play history information PHI by accumulating pieces of play information PI which is the play history of the player P in the game. The play information PI and the play history information PHI of this embodiment will be described later. The excerpt information generating portion 14c generates excerpt play history information from the play history information PHI of the other player. The generating method will be described later. The excerpt information obtaining portion 14d requests to the server and obtains the play history information PHI of the other player and makes the excerpt information generating portion 14c generate the excerpt play history information. The other-player display controlling portion 14e displays the play state of the other player in the game image GI based on the excerpt play history information. The mode of displaying the play state of the other player will be described later.

The pieces of play information PI and the play history information are shown in FIG. 4. The piece of play information PI is data to be generated in response to an operation by the player P during the game, and comprises an operation timing, an operation cell, operation data, operation information, and true-false information. The operation timing indicates a timing when the operation was performed which is shown as the elapse time after starting time in this embodiment. The operation cell indicates a cell where the operation was performed. The operation data indicates in the operated, cell a numeral input or eliminated. The operation information indicates an operation content, in this embodiment, "input" or "elimination". The true-false information indicates whether the input numeral is correct or not. The play history information PHI is obtained by accumulating the pieces of play information PI in the order of generating, that is, the operation timing.

An outline of hardware configuration of the server 2 will be described by using FIG. 5. The server 2 comprises a server communication portion 20 which is an interface for communicating data with the game terminal 1, a history information storing portion 21 which stores player data PD including the play history information PHI and the like of each player P, and a server control unit 22 which controls operations of the server 2. The server control unit 22 is configured mainly by a CPU and a memory area such as a RAM and a ROM necessary for operations of the CPU. In the memory area, a program for realizing the present invention is stored. By executing the program, the server control unit 22 functions mainly as a history information providing portion 22a.

The player data PD stored in the history information storing portion 21 is shown in FIG. 6. The player data PD is data for each player, the data being associated with information with respect to the player. The player data PD has a player ID, player's profile, verification information, a rank, a level, and play history information. The player ID is identification information for identifying each player P. The profile includes a player name, avatar information, and the like. The rank indicates a rank of the clear time in all players P. The level indicates a corresponding level out of plural levels. In this embodiment, as plural kinds of game questions are prepared, the play history information in the player data PD is stored, for example, with question identification information so as to identify the play history information PHI corresponding to each of the game questions.

In what follows, a case will be described that a player P plays the game with a quasi other player P' (sometimes referred to as "the rival"). The game image GI during the game will be described by using FIG. 7. First, in the game image GI, a play state of the other player P' is also displayed together with a game state of the player P. The play state of the other player P' is represented by displaying a rival color cell CM having a color corresponding to the other player P' at a position of the cell M obtained by the other player P' at a timing when the other player P' obtained the cell M. "The timing when the other player P' obtained" means a timing when a correct numeral was input in a case that even after the numeral was input, the input was maintained until the game was cleared.

Figure 7:
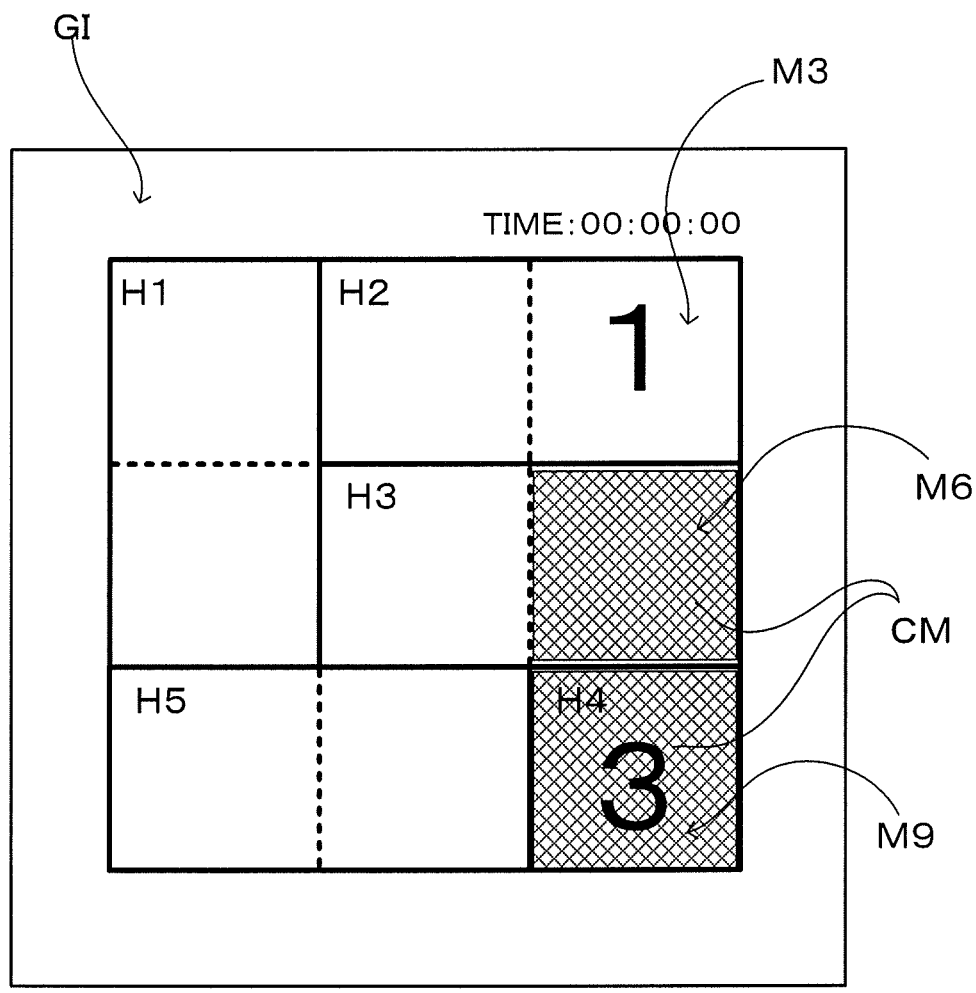
FIG. 7 is a diagram showing a state of game image during the game.

In an example shown in FIG. 7, as the state of the player P, the state that "1" has been input to a cell M3 and "3" has been input to a cell M9. Additionally, as the state of the other player P', the rival color cells CM have been displayed at the positions of the cells M6 and M9, which means the cells M6 and M9 ware obtained by the other player P'. The color of the rival color cell CM is a predetermined color corresponding to the other player P'. In a case that the other player P' clears the game before the player P does, a message indicating the other player P7 having finished the game may be displayed.

Figure 8:
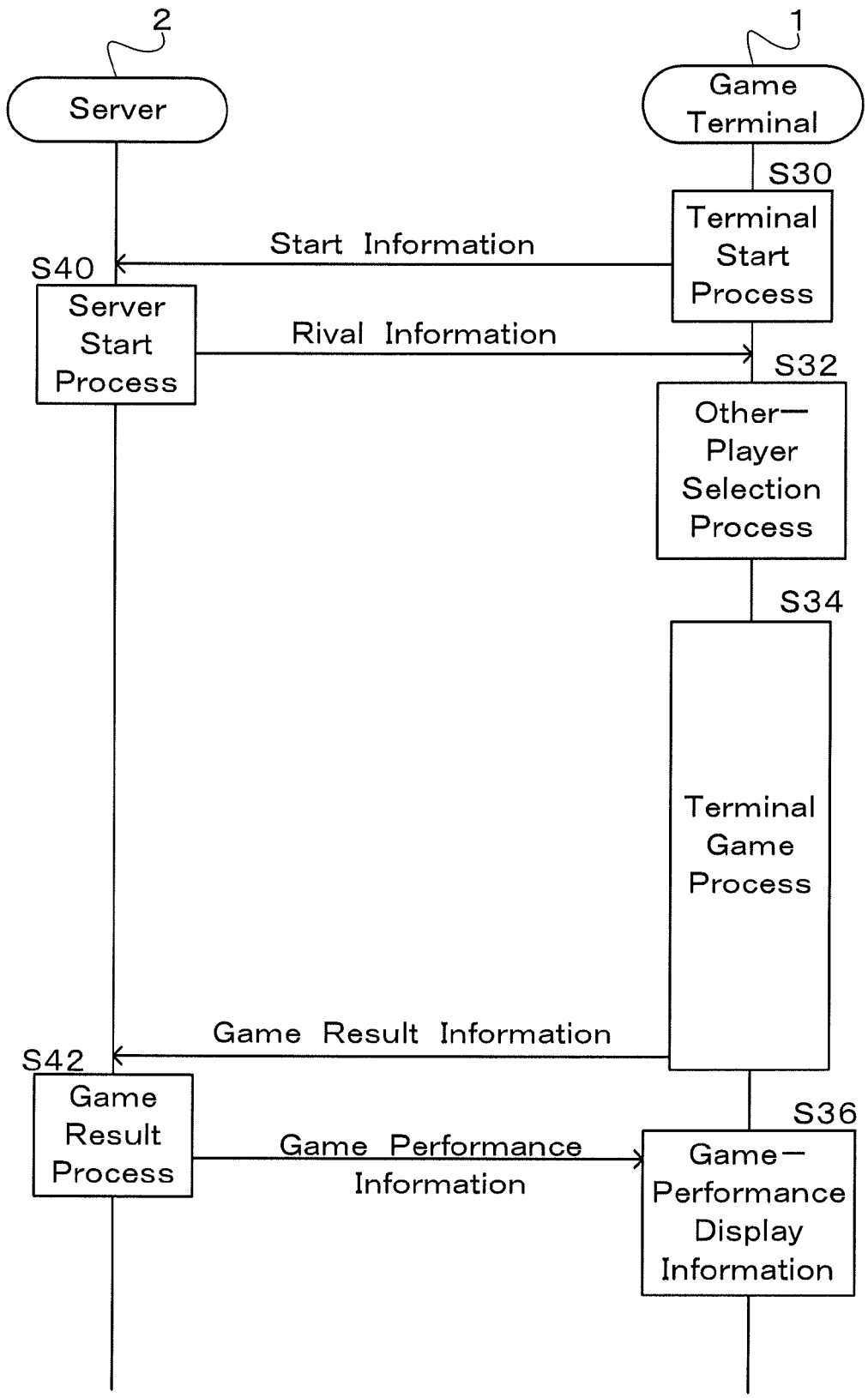
FIG. 8 is a sequence diagram showing a flow of processing executed at the server and the game terminal.

Processes executed from the moment of starting the game to the moment of finishing the game in the game terminal 1 and the server 2 will be described by using FIG. 8. The processes in the game terminal 1 are controlled by the terminal control unit 14, and the processes in the server 2 are controlled by the server control unit 22. First, when a predetermined start operation is performed by the player P at the game terminal 1, a terminal start process is executed (step S30). In the terminal start process, the player P is allowed to input the player ID and the verification information, and start information including the player Id and the verification information is transmitted to the server 2. In the server 2 where the start information has been received, a server start process is executed (step S40).

In the server start process, the player data PD corresponding to the player ID included in the start information is referred to execute a verification process and specify the level of the player P. By referring to the player data PD of the other player P', three players having the same level as the player P are selected as candidates of the other player P'. Then, the play history information PHI, the clear time and profile of the selected three candidates of the other player P' are extracted from the player data PD of them and transmitted to the game terminal 1 as rival information. Thereby, the transmission of the start information functions as a request of information with respect to the other player.

In the game terminal 1 where the rival information has been received, an other-player selection process is executed (step S32). In the other-player selection process, one other player P' is determined and excerpt play history information is generated based on the play history information associated with the other player P'. The other-player selection process will be described later. When the other player P' is determined in the other-player selection process, a terminal game process is executed (step S34). In the terminal game process, the above mentioned game image GI is displayed, the game timer 15 starts counting the elapse time, and the puzzle game is started. During the puzzle game, in the game image GI, the play state of the player P is displayed in response to operations, and the play state of the other player P' is displayed based on the excerpt play history information.

Additionally, a piece of play information PI is generated and accumulated in response to the operation by the player P, whereby the play history information PHI is generated. The details of the terminal game process will be described later. When the game is cleared, game result information including the player ID, the play history information PHI, and the clear time is transmitted to the server 2. In the server 2 where the game result information has been received, a game result process is executed (step S42). In the game result process, the play history information PHI and the clear time in the player data PD of the player P are replaced with the play history information PHI and the clear time included in the game result information.

Further, the rank of the player P is determined based on the clear time included in the game result information, and the level of the player P is determined based on the clear time and the play history information PHI. The determined rank and level are transmitted as game performance information to the game terminal 1. Additionally, the rank and level in the player data PD of the player P is updated by the determined rank and level. In the game terminal 1 where the game performance information has been received, a game-performance display process is executed (step S36). In the game-performance display process, the rank and level included in the game performance information is displayed in the display portion 10.

Figure 9:
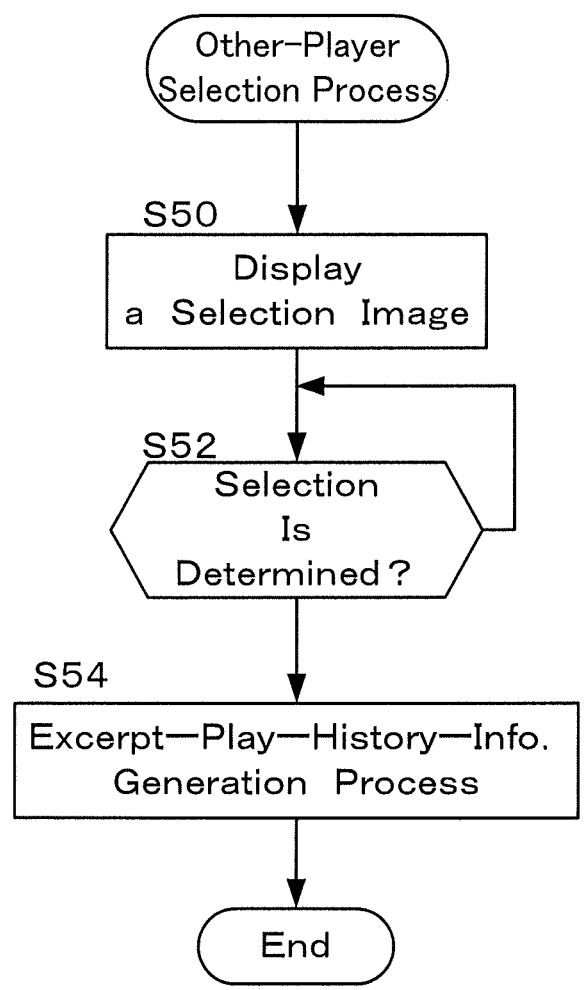
FIG. 9 is a flow chart showing a flow of processing in an other-player selection process.

The other-player selection process will be explained in line with a flow chart shown in FIG. 9. The other-player selection process is controlled by the terminal control unit 14 of the game terminal 1. First, at step S50, a selection image is displayed in a display portion 10 in order to allow the player P select as the other player P', one out of the three candidates of the other player included in the rival information. In the selection image, for example, a list of profiles of the candidates of the other player is displayed.

A predetermined selection operation is performed by the player P, whereby the other player P' is selected. Then, the process goes to step S54 to execute an excerpt-play-history-information generation process. The excerpt play history information is generated by excerpting from the play history information PHI of the other player P', only pieces of play information PI with respect to the last performed operation for each cell M. For example, the play history information PHI is read from the last piece of play information PI therein, and the piece of play information PI corresponding to the first input of a correct answer for each cell M is excerpted. After the excerpt play history information is generated, the other-player selection process is ended. Alternatively, the excerpt play history information can be generated by setting a flag to the last play information PI for each cell M, every time each operation is performed in the course of accumulating the play history information PHI.

Figure 10:
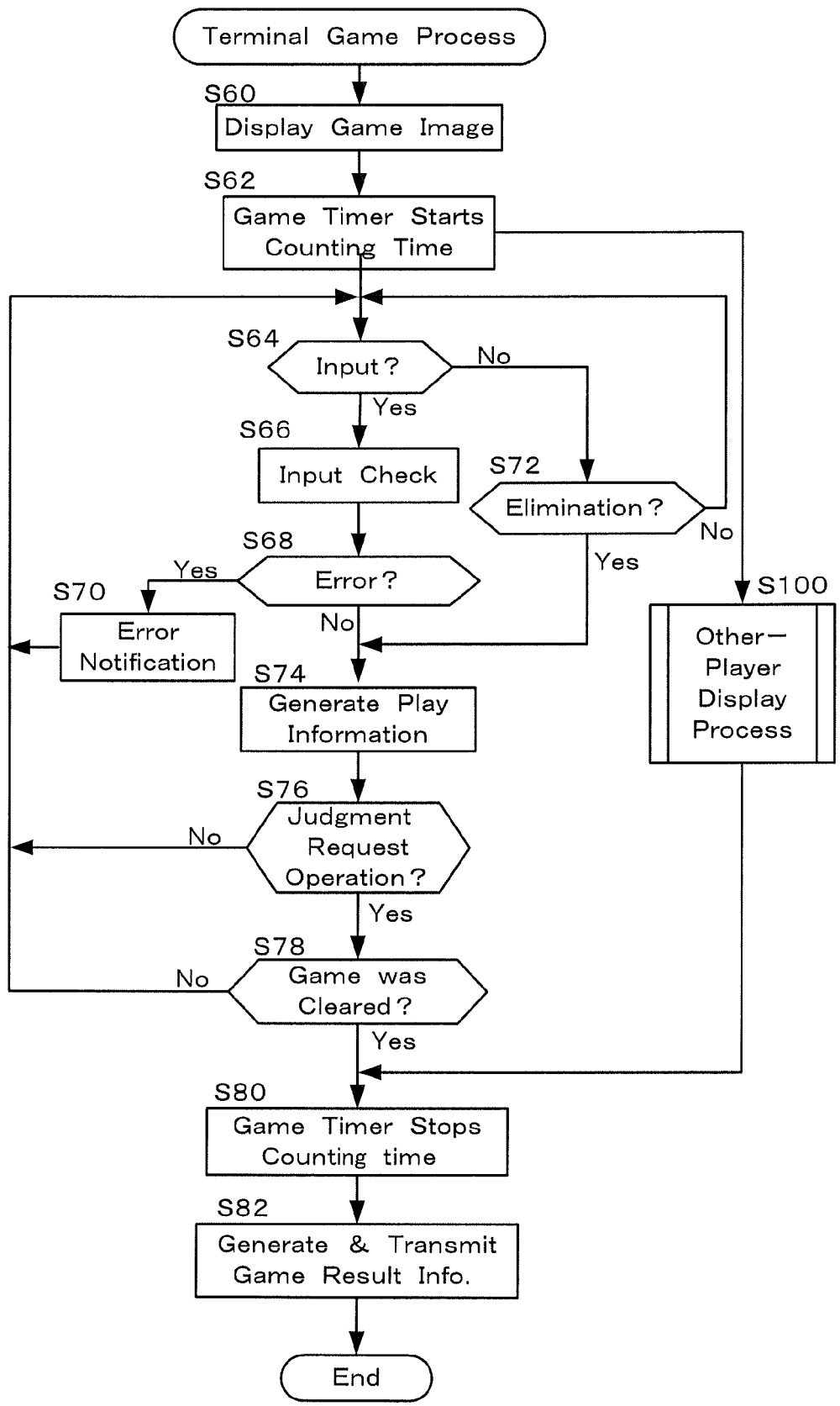
FIG. 10 is a flow chart showing a flow of processing in a terminal game process.

The terminal game process will be described by using a flow chart shown in FIG. 10. First, at step S60, the game image GI is displayed, and at step S62 the game timer 15 is made to start counting elapse time with a predetermined notice of game start. Thereby, the puzzle game is started.

After the puzzle game is started, at steps S64 to S76, processes in response to operations by the player P are executed. Additionally, at step S100, the other-player display process with respect to the other player P' is executed. The other-player display process will be described later.

The processes to be executed in response to the operations by the player P will be described. After the puzzle game is started, the process becomes a state of waiting operations. In step S64, it is determined whether or not the input operation has been performed to any one of the cells M. In a case where the input operation has been performed, the process goes to step S66 to execute an input check. In the input check, it is determined whether or not the numeral inputted is used duplicatively. In a case where it is determined that is used duplicatively, at step S68 it is determined that the state is an error. At step S70 an error notification is displayed in the game image GI and the input operation turns to be invalid, and the process goes back to step S64 to return to be the state of waiting operations.

In a case where the inputted numeral is not used duplicatively, at step S68 it is determined the state is not an error and the process goes to step S74. On the other hand, at step S64, in a case where the input operation has not been performed, the process goes to step S72 to determine whether or not an elimination operation has been performed. In a case where it is determined that the elimination operation has not been performed, the process goes back to step S64 to return to be the state of waiting operations. In a case where it is determined that the elimination operation has been performed, the process goes to step S74.

At step S74, the play information PI is generated in response to the input operation or the elimination operation, and accumulated as the play history information PHI. The data structure of the play information PI is above mentioned. Moreover, the inputted numeral is compared to the correct answer, and a determination result of that can be set in the true-false information of the play information PI. Next, the process goes to step S76 to determine whether or not a judgment request operation has been performed by the player P. In a case where it is determined that the judgment request operation has not been performed, the process goes back to step S64 to return to be the state of waiting operations. In a case where it is determined that the judgment request operation has been preformed, the process goes to step S78 to determine whether or not the game is cleared. In a case where the numerals inputted in all of the cells M are correct, it is determined that the game is cleared. Ina case where the game is not cleared, the process goes back to step S64 to return to be the state of waiting operations in order to continue the puzzle game. In a case where it is determined that the game is cleared, the process goes to step S80 to make the game timer 15 stop counting time and end the puzzle game. Further, the process goes to step S82 to generate the game result information and transmit it to the server 2. In the game result information, the player ID of the player P, the clear time counted by the game timer 15, and the play history information PHI are included.

Figure 11:
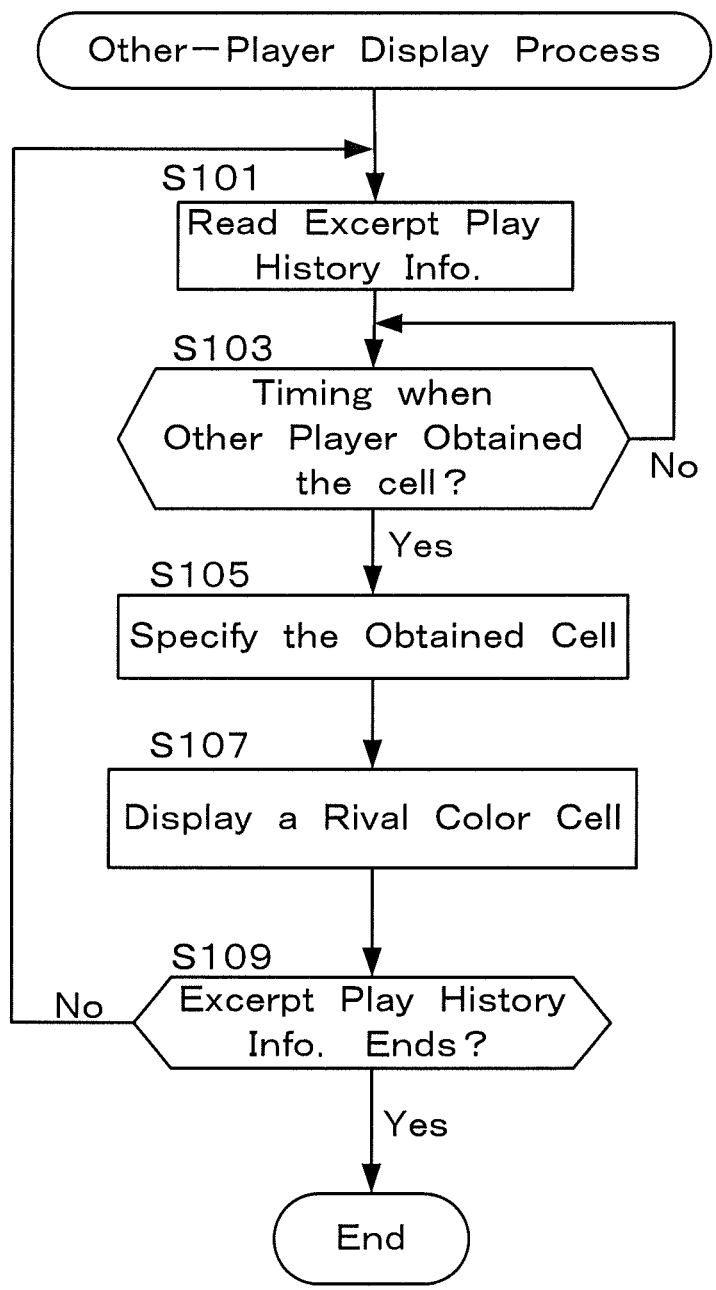
FIG. 11 is a flow chart showing a flow of processing in another player display process.

The other player display process will be described by using a flow chart shown in FIG. 11. When it is determined that the game is cleared at step S78 in the terminal game process, the other player display process is forcibly ended by an interrupt processing. At step S101 the play information PI of the excerpt play history information is read out. At step S103, it is determined whether or not it is the timing when the cell M was obtained by the other player P', and the process becomes to a state of waiting the timing. It is determined that it is the timing when the cell M was obtained in a case where the elapse time counted by the game timer 15 is coincident with the operation timing indicated in the play information PI.

In a case where it is determined that it is the timing when the cell M was obtained, the process goes to step S105 to specify a cell M obtained by the other player P'. Concretely, the operation cell indicated by the play information PI is specified as the cell M obtained. Next, the process goes to step S107 to display in the specified cell M, an indicator indicating that the cell M was obtained. Concretely, at the position of the cell M specified at step S105, a rival color cell CM is displayed, the rival color cell CM having the color (for example, red) corresponding to the other player P'. After displaying the rival color cell CM, the process goes to step S109 to determine whether or not the process has been ended with respect to all pieces of the play information PI included in the excerpt play history information.

In a case where it is determined that the process has not been ended, the process goes back to step S101 in order to execute the process for the next piece of play information PI. In a case where it is determined that the process has been ended, the other player display process is ended. Additionally, after step S101, a clear notification indicating the other player P' ends the game, may be displayed in the game image GI The terminal control unit 14 functions as the game executing portion 14a by the terminal game process, as the history information accumulating portion 14b by the process of step S74, as the excerpt information generating portion 14c by the process of step S54, and as the other player display controlling portion 14e by the other player display process. Additionally, the terminal control unit 14 functions as the excerpt information obtaining portion 14d by the process for requesting the rival information of step S30 and based on the obtained rival information, generating the excerpt play history information by the excerpt information generating portion 14c.

The present invention is not limited to the above mentioned embodiment, and can be executed in a various embodiments. For example, the game system can be set so that a plurality of other players are selected. In this case, by associating each other player with a different color, the rival color cell CM corresponding to each player is displayed in the game image GI. Additionally, the following embodiment can be adopted: in the server start process, only profiles of the candidates of the other player is transmitted as the candidates information to the game terminal, and after one other player P' is selected by the player P, the play history information PHI and the clear time are excerpted from the player data PD of the selected other player P' and transmitted.

The excerpt play history information can be structured by only a part of the play information. Additionally, in the operations to be recorded in the play information, not only operations to each cell M but also operations to all cells M such as all elimination can be included. Without the processes with respect to an input check at step S66 and step S68, when it is determined that a numeral has been inputted at step S64, the process may go to step S74.

The game system can be structured, so that, without updating the play history information PHI of the player data PD, the player history information PHI obtained by the server 2 is accumulated with a record timing in the player data PD. It is not necessary that the cells M forming a grid displayed in the game image GI is arranged 3 cells×3 cells, as long as the number of rows is the same as the number of the columns. Additionally, with each cell M, not only an addition is associated, but also a subtraction of a predetermined direction can be associated. The hint letter H can be minus numeral.

Additionally, the excerpt information generating portion can be provided to the server 2. In this case, the game system can be configured in such a way that, in the server 2, the excerpt play history information is generated from the play history information of the candidates of the other player, and the rival information including the excerpt play history information is provided to the game terminal 1. Alternatively, the game system can be configured in such a way that, in the server 2, the excerpt play history information is generated from the obtained play history information and stored in the player data PD, and the rival information including the excerpt play history information stored in the player data PD is provided to the game terminal 1.

Figure 12:
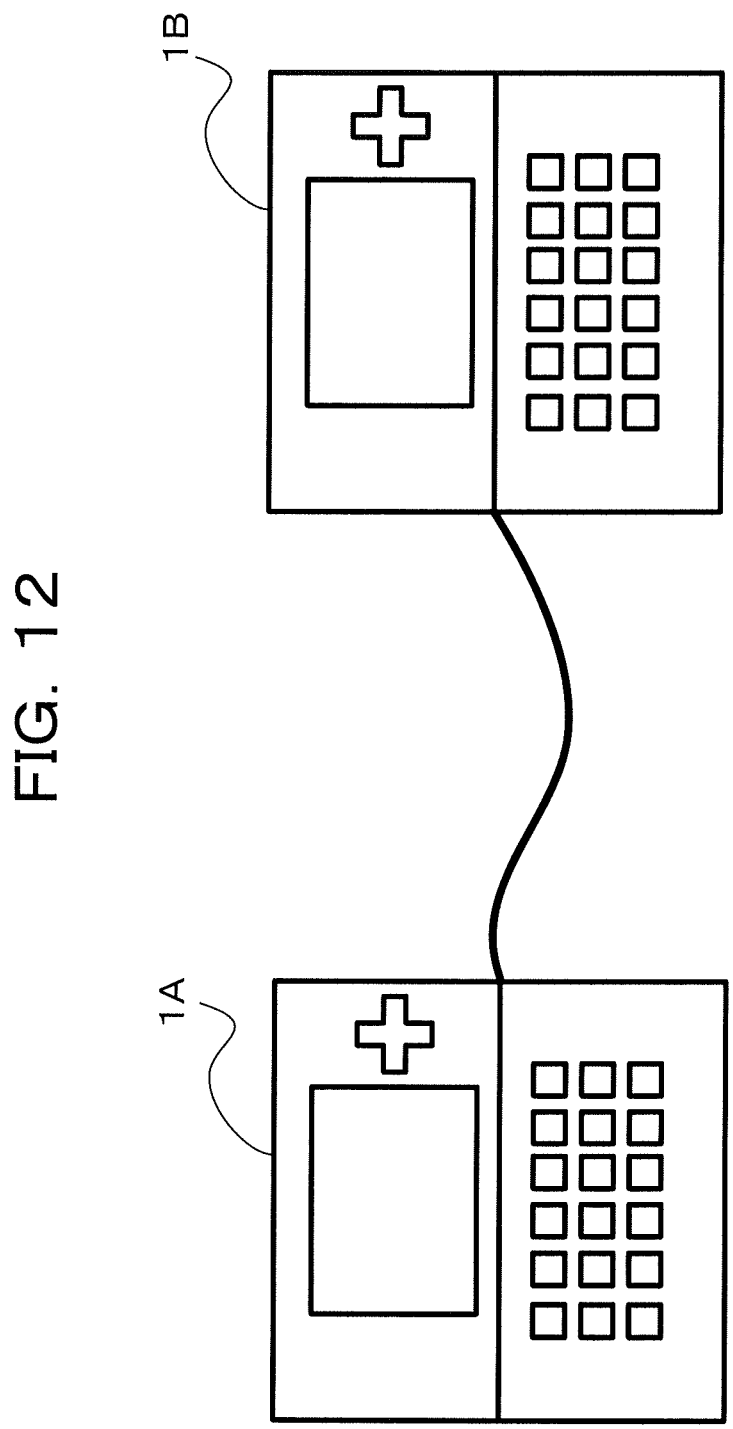
FIG. 12 is a diagram showing an example of embodiment where two game terminals are connected directly with each other to communicate data.

Further, in a case where the excerpt information generating portion is provided to the game terminal 1, the game system can be configured in such way that in the game terminal 1, the excerpt play history information is generated from the play history information generated in itself, and the excerpt play history information is provided to the server 2. In this case, in the server 2, the excerpt play history information is stored as data included in the player data PD. Then, The excerpt play history information included in the player data PD is provided to the other game terminal 1 as the rival information. Additionally, a storage portion corresponding to the history information storing portion 21 can be provided to the game terminal 1, whereby the game system can be configured as shown in FIG. 12 in such a way that two game terminals 1A and 1B are connected directly with each other, and the play history information or the excerpt play history information is, without the server 2, communicated between the game terminals 1A and 1B.

The invention claimed is:

1. A game system including a game terminal where operations by a player are accepted and a predetermined game is executed and a server capable of communicating data with the game terminal, wherein:
   the game terminal comprises:
     a display portion for displaying game images of the predetermined game;
     a game executing portion adapted and configured to execute a game where a position is obtained by operations performed by a player as the predetermined game, each of the operations for obtaining any one of positions in the game image, and a plurality of positions obtained affect a game result; and
     a history information accumulating portion adapted and configured to:
       accumulate pieces of play information during the game, each piece of play information including an operation performed up to obtaining one of the positions and a timing when the operation is performed that are associated with each other, and
       generate play history information including the pieces of play information accumulated with respect to each of positions obtained by the player during the game, and
   the server comprises:
     a history information storing portion adapted and configured to store history information based on the play history information for each player; and
     a history information providing portion adapted and configured to, in response to a request for information relating to another player from the game terminal, select a selected piece of the history information, and provide information based on the selected piece of history information,
   the game terminal or the server further comprises an excerpt information generating portion adapted and configured to generate excerpt play history information by excerpting the pieces of play information relating to an operation performed last for each of obtained positions from the play history information or the selected piece of history information, and
   the game executing portion of the game terminal further comprises:
     an excerpt information obtaining portion adapted and configured to obtain the excerpt play history information by requesting the excerpt play history information relating to another player from the server; and
     an another player display controlling portion adapted and configured to control a display of the game image in the display position of the game terminal so as to display in sequence by following the timing indicated by each piece of play information included in the obtained excerpt play history information, an indicator at the position indicated by the piece of play information, the indicator indicating that the corresponding position was obtained by the another player.

2. The game system according to claim 1, wherein
   the excerpt information generating portion is provided in the game terminal to generate the excerpt play history information from the play history information generated by the history information accumulating portion of the game terminal,
   the game terminal comprises a history information transmitting portion for transmitting to the server, the excerpt play history information generated by the excerpt information generating portion,
   the history information storing portion of the server stores for each player, the excerpt play history information transmitted from the game terminal, and
   the history information providing portion of the server provides the excerpt play history information selected to the game terminal.

3. The game system according to claim 2, wherein
   the history information accumulating portion of the game terminal accumulates the pieces of play information from a moment of starting the game to a moment of ending the game to generate the play history information,
   the history information transmitting portion of the game terminal transmits the excerpt play history information after the moment of ending the game, and
   the excerpt information obtaining portion of the game terminal obtains the excerpt play history information before the moment of starting the game.

4. The game system according to claim 1, wherein
   the excerpt information generating portion is provided in the game terminal,
   the game terminal has a history information transmitting portion for transmitting to the server, the play history information generated by the history information accumulating portion,
   the history information storing portion of the server stores for each player, the play history information transmitted from the game terminal,
   the history information providing of the server provides the game terminal with the play history information selected, and
   the excerpt information generating portion of the game terminal generates the excerpt play history information from the play history information provided.

5. The game system according to claim 4, wherein
the history information accumulating portion of the game terminal accumulates pieces of the play information from the moment of starting the game to the moment of ending the game to generate the play history information,
the history information transmitting portion of the game terminal transmits the play history information after the moment of ending the game, and
the excerpt information obtaining portion of the game terminal obtains the excerpt play history information before the moment of starting the game.

6. The game system according to claim 1, wherein
each of the plurality of positions is a region having a predetermined shape in the game image,
the another player display controlling portion of the game terminal colors in sequence by following the timing, the region corresponding to the position where the indicator should be indicated with a color corresponding to the another player.

7. The game system according to claim 6, wherein
the game executing portion of the game terminal allows the player to input information to be associated with each of the regions, and, when there is a predetermined relation between the information associated with one of the regions and the information associated with at least one other region, determines the regions having the predetermined relation have been obtained.

8. The game system according to claim 1, wherein
the game terminal is a portable terminal.

9. A game terminal comprising a display portion for displaying game images of a predetermined game, the game terminal capable of communicating data with a server or another game terminal, wherein the game terminal further comprises:
a game executing portion adapted and configured to execute a game where a position is obtained by operations performed by a player as the predetermined game, each of the operations for obtaining any one of positions in the game image, and a plurality of positions obtained affect a game result;
a history information accumulating portion adapted and configured to:
accumulate pieces of play information during the game, each piece of play information including an operation performed up to obtaining one of the positions and a timing when each operation is performed are associated with each other, and
generate play history information including the pieces of play information accumulated with respect to each of positions obtained by the player during the game,
a history information transmitting portion adapted and configured to transmit to the server or another game terminal, history information based on the play history information accumulated by the history information accumulating portion,
an excerpt information generating portion adapted and configured to generate excerpt play history information by excerpting the pieces of play information relating to an operation performed last for each of obtained positions from the play history information,
an excerpt information obtaining portion adapted and configured to obtain the excerpt play history information by requesting the history information based on the play history information of another player from the server or the another game terminal, and
an another player display controlling portion adapted and configured to control a display of the game image in the display portion so as to display in sequence by following the timing indicated by each piece of play information included in the excerpt play history information of the another player, an indicator at the position indicated by the piece of play information, the indicator indicating that the corresponding position was obtained by the another player.

10. The game terminal according to claim 9, wherein
the excerpt information generating portion generates the excerpt play history information from the play history information accumulated by the history information accumulating portion of the game terminal,
the history information transmitting portion transmits the excerpt play history information generated by the excerpt information generating portion, and
the excerpt information obtaining portion obtains the excerpt play history information by requesting to the server, the excerpt play history information of the another player.

11. The game terminal according to claim 10, wherein
the history information accumulating portion generates the play history information, accumulating the pieces of play information from the moment of starting the game to the moment of ending the game,
the excerpt information transmitting portion transmits the excerpt play history information after the moment of ending the game, and
the excerpt information obtaining portion obtains the excerpt play history information before the moment of starting the game.

12. The game terminal according to claim 9, wherein
the history information transmitting portion transmits the play history information to the server,
the excerpt information generating portion generates the excerpt play history information from the play history information obtained from the server, and
the excerpt information obtaining portion obtains the excerpt play history information by requesting the play history information of the another player to the server to make the excerpt information generating portion generate the excerpt play history information.

13. The game terminal according to claim 12, wherein
the history information accumulating portion generates the play history information, accumulating the pieces of play information from the moment of starting the game until the moment of ending the game,
the history information transmitting portion transmits the play history information after the moment of ending the game, and
the excerpt information obtaining portion obtains the excerpt play history information before the moment of starting the game.

14. The game terminal according to claim 9, wherein
each of the plurality of positions is a region having a predetermined shape in the game image, and
the another player display controlling portion colors in sequence by following the timing, the region corresponding to the position where the indicator should be indicated with a color corresponding to the another player.

15. The game terminal according to claim 14, wherein
the game executing portion allows the player to input information to be associated with each of the regions, and, when there is a predetermined relation between the information associated with one of the regions and the information associated with at least one other region, determines the regions having the predetermined relation have been obtained.

16. The game terminal according to claim 9, wherein the game terminal is a portable terminal.

* * * * *